(12) United States Patent
Loomis et al.

(10) Patent No.: US 7,898,409 B2
(45) Date of Patent: Mar. 1, 2011

(54) CIRCUIT FOR EXCLUSION ZONE COMPLIANCE

(75) Inventors: Peter Van Wyck Loomis, Sunnyvale, CA (US); James M. Janky, Los Altos, CA (US); Bruce D. Riter, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 294 days.

(21) Appl. No.: 12/100,163

(22) Filed: Apr. 9, 2008

(65) Prior Publication Data

US 2009/0256744 A1  Oct. 15, 2009

(51) Int. Cl.
*G08B 1/08* (2006.01)

(52) U.S. Cl. ............ 340/539.13; 340/539.2; 340/426.15; 340/426.19; 340/985; 340/989; 340/992; 340/993; 342/176; 342/195; 342/413; 342/464; 701/207; 701/208; 701/213

(58) Field of Classification Search ............. 340/539.13, 340/539.2, 426.15, 426.19, 985, 989, 992, 340/993; 342/176, 195, 357.06, 537.12, 342/413, 464; 701/207, 208, 213
See application file for complete search history.

(56) References Cited

U.S. PATENT DOCUMENTS

| | | | |
|---|---|---|---|
| 3,796,322 A | 3/1974 | Cording | |
| 4,752,012 A | 6/1988 | Juergens | |
| 4,857,753 A | 8/1989 | Mewburn-Crook et al. | |
| 5,095,531 A | 3/1992 | Ito | |
| 5,491,486 A | 2/1996 | Welles, II | |
| 5,640,452 A | 6/1997 | Murphy | |
| 5,650,770 A | 7/1997 | Schlager et al. | |
| 5,752,197 A | 5/1998 | Rautiola | |
| 5,859,839 A | 1/1999 | Ahlenius et al. | |
| 5,883,817 A | 3/1999 | Chisholm et al. | |
| 5,887,269 A | 3/1999 | Brunts et al. | |
| 5,890,091 A | 3/1999 | Talbot et al. | |
| 5,917,405 A | 6/1999 | Joao | |
| 5,987,379 A | 11/1999 | Smith | |
| 6,016,117 A | 1/2000 | Nelson, Jr. | |

(Continued)

FOREIGN PATENT DOCUMENTS

GB  2373086  9/2002

(Continued)

OTHER PUBLICATIONS

"Tower Cranes Anti-Collision and Zone Protection System", www.tac3000.com, (2004),36.

(Continued)

*Primary Examiner* — Tai T Nguyen

(57) ABSTRACT

A circuit for exclusion zone compliance is recited. In one embodiment, the circuit comprises a satellite navigation signal reception component configured for receiving at least one signal from at least one Global Navigation Satellite System satellite and a navigation data deriving component configured for deriving position data and a clock time from the at least one signal. The circuit further comprises a non-volatile memory component configured for storing an encrypted data set describing the boundaries of an exclusion zone and a data blocking component configured for controlling the accessing of the encrypted data set. The circuit further comprises a data control component configured for blocking the output of a signal from the circuit in response an indication selected from the group consisting of: an indication that the circuit is located within an exclusion zone and an indication that output of said signal is not permitted based upon said clock time.

25 Claims, 12 Drawing Sheets

U.S. PATENT DOCUMENTS

| | | | |
|---|---|---|---|
| 6,046,687 A | 4/2000 | Janky |
| 6,064,335 A | 5/2000 | Eschenbach |
| 6,067,031 A | 5/2000 | Janky et al. |
| 6,118,196 A | 9/2000 | Cheng-Yon |
| 6,124,825 A | 9/2000 | Eschenbach |
| 6,243,648 B1 | 6/2001 | Kilfeather et al. |
| 6,268,804 B1 | 7/2001 | Janky et al. |
| 6,301,616 B1 | 10/2001 | Pal et al. |
| 6,317,500 B1 | 11/2001 | Murphy |
| 6,320,273 B1 | 11/2001 | Nemec |
| 6,330,149 B1 | 12/2001 | Burrell |
| 6,356,196 B1 | 3/2002 | Wong et al. |
| 6,362,736 B1 | 3/2002 | Gehlot |
| 6,377,165 B1 | 4/2002 | Yoshioka et al. |
| 6,453,237 B1 | 9/2002 | Fuchs et al. |
| 6,459,988 B1 | 10/2002 | Fan et al. |
| 6,480,788 B2 | 11/2002 | Kilfeather et al. |
| 6,505,049 B1 | 1/2003 | Dorenbosch |
| 6,512,465 B2 | 1/2003 | Flick |
| 6,539,307 B1 | 3/2003 | Holden et al. |
| 6,560,536 B1 | 5/2003 | Sullivan et al. |
| 6,609,064 B1 | 8/2003 | Dean |
| 6,651,000 B2 | 11/2003 | Diggelen et al. |
| 6,657,587 B1 | 12/2003 | Mohan |
| 6,658,349 B2 | 12/2003 | Cline |
| 6,675,095 B1 | 1/2004 | Bird et al. |
| 6,677,938 B1 | 1/2004 | Maynard |
| 6,700,762 B2 | 3/2004 | Underwood et al. |
| 6,725,158 B1 | 4/2004 | Sullivan et al. |
| 7,725,158 B2 | 4/2004 | Sullivan et al. |
| 6,801,853 B2 | 10/2004 | Workman |
| 6,804,602 B2 | 10/2004 | Impson et al. |
| 6,826,452 B1 | 11/2004 | Holland et al. |
| 6,829,535 B2 | 12/2004 | Diggelen et al. |
| 6,843,383 B2 | 1/2005 | Schneider et al. |
| 6,864,789 B2 | 3/2005 | Wolfe |
| 6,865,169 B1 | 3/2005 | Quayle et al. |
| 6,934,629 B1 | 8/2005 | Chisholm et al. |
| 6,948,066 B2 | 9/2005 | Hind et al. |
| 6,970,801 B2 | 11/2005 | Mann |
| 7,020,555 B1 | 3/2006 | Janky et al. |
| 7,032,763 B1 | 4/2006 | Zakula, Sr. et al. |
| 7,034,683 B2 | 4/2006 | Ghazarian |
| 7,050,907 B1 | 5/2006 | Janky et al. |
| 7,070,060 B1 | 7/2006 | Feider et al. |
| 7,095,368 B1 | 8/2006 | Diggelen |
| 7,095,370 B1 | 8/2006 | Diggelen et al. |
| 7,158,883 B2 | 1/2007 | Fuchs et al. |
| 7,194,620 B1 | 3/2007 | Hayes |
| 7,289,875 B2 | 10/2007 | Recktenwald et al. |
| 7,295,855 B1 | 11/2007 | Larsson et al. |
| 7,298,319 B2 | 11/2007 | Han et al. |
| 7,308,114 B2 | 12/2007 | Takehara et al. |
| 7,313,476 B2 | 12/2007 | Nichols et al. |
| 7,324,921 B2 | 1/2008 | Sugahara et al. |
| 7,344,037 B1 | 3/2008 | Zakula et al. |
| 7,367,464 B1 | 5/2008 | Agostini et al. |
| 7,548,200 B2 | 6/2009 | Garin et al. |
| 7,548,816 B2 | 6/2009 | Riben et al. |
| 7,639,181 B2 | 12/2009 | Wang et al. |
| 7,667,642 B1 | 2/2010 | Frericks et al. |
| 7,710,317 B2 | 5/2010 | Cheng et al. |
| 2002/0070856 A1 | 6/2002 | Wolfe |
| 2002/0082036 A1 | 6/2002 | Ida et al. |
| 2002/0117609 A1 | 8/2002 | Thibault et al. |
| 2002/0142788 A1 | 10/2002 | Chawla et al. |
| 2003/0045314 A1 | 3/2003 | Burgan et al. |
| 2003/0064744 A1 | 4/2003 | Zhang et al. |
| 2003/0071899 A1 | 4/2003 | Joao |
| 2003/0073435 A1 | 4/2003 | Thompson et al. |
| 2003/0119445 A1 | 6/2003 | Bromham et al. |
| 2004/0024522 A1* | 2/2004 | Walker et al. ................. 701/210 |
| 2004/0034470 A1 | 2/2004 | Workman |
| 2004/0078594 A1 | 4/2004 | Scott |
| 2004/0196182 A1 | 10/2004 | Unnold |
| 2004/0219927 A1 | 11/2004 | Sumner |
| 2004/0243285 A1* | 12/2004 | Gounder ........................ 701/1 |
| 2005/0030175 A1 | 2/2005 | Wolfe |
| 2005/0055161 A1 | 3/2005 | Kalis et al. |
| 2005/0095985 A1 | 5/2005 | Hafeoz |
| 2005/0103738 A1 | 5/2005 | Recktenwald et al. |
| 2005/0116105 A1 | 6/2005 | Munk et al. |
| 2005/0137742 A1 | 6/2005 | Goodman et al. |
| 2005/0147062 A1 | 7/2005 | Khouaja et al. |
| 2005/0154904 A1 | 7/2005 | Bhargav et al. |
| 2005/0179541 A1 | 8/2005 | Wolfe |
| 2005/0242052 A1 | 11/2005 | O'Connor et al. |
| 2005/0248444 A1 | 11/2005 | Joao |
| 2006/0027677 A1 | 2/2006 | Abts |
| 2007/0005244 A1 | 1/2007 | Nadkarni |
| 2007/0174467 A1 | 7/2007 | Ballou et al. |
| 2007/0255498 A1 | 11/2007 | McDaniel et al. |
| 2008/0014965 A1 | 1/2008 | Dennison et al. |
| 2008/0036617 A1 | 2/2008 | Arms et al. |
| 2008/0086685 A1 | 4/2008 | Janky et al. |
| 2008/0122234 A1 | 5/2008 | Alioto et al. |
| 2009/0009389 A1 | 1/2009 | Mattos |
| 2009/0322890 A1 | 12/2009 | Bocking et al. |

FOREIGN PATENT DOCUMENTS

| | | |
|---|---|---|
| JP | 05286692 | 11/1993 |
| JP | 8240653 | 9/1996 |
| JP | 2000/048283 | 2/2000 |
| JP | 2000/249752 | 9/2000 |
| JP | 2002/197593 | 7/2002 |
| JP | 2002/197595 | 7/2002 |
| JP | 2002/217811 | 8/2002 |
| WO | WO-02/035492 | 5/2002 |
| WO | WO-03/007261 | 1/2003 |
| WO | WO-2004/017272 | 2/2004 |
| WO | WO-2004/083888 | 9/2004 |
| WO | WO-2005/017846 | 2/2005 |
| WO | WO-2009/084820 | 7/2009 |

OTHER PUBLICATIONS

"Anti-Collision Systems A Clash of Cultures", http://www.cranestodaymagazine.com/story.asp?sectionCode=66&storyCode=2043070, (Mar. 21, 2007),6.

Abderrahim, M. et al., "A Mechatronics Security System for the Construction Site", www.elsevier.com/locate/autcon, (Sep. 7, 2004),460-466.

"Highland Man'S Invention Success With Dewalt", http://www.heraldextra.com/content/view/195674/4/, (Oct. 8, 2006),3.

\* cited by examiner

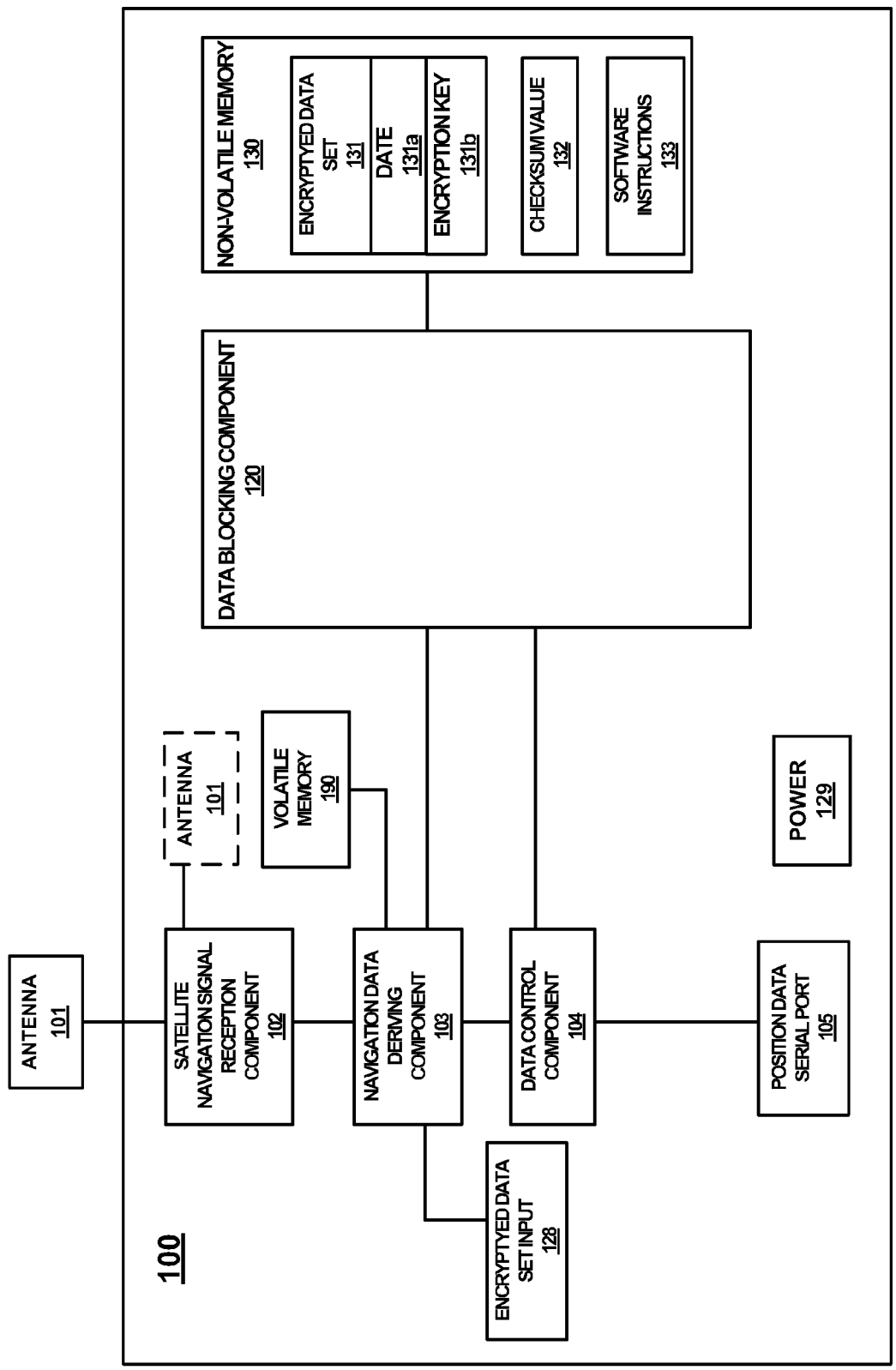

US 7,898,409 B2

CIRCUIT FOR EXCLUSION ZONE COMPLIANCE

FIELD OF THE INVENTION

Embodiments of the present invention are related to geographic position determining systems.

BACKGROUND OF THE INVENTION

Geographic data is increasingly used to provide geo-spatial data to a wide variety of business, government, and academic applications. Increasingly, remote Global Navigation Satellite System (GNSS) receivers are used to collect position data in a wide variety of electronic devices. For example, the GNSS receivers are now incorporated into cellular telephones, personal digital assistants (PDAs), dedicated navigation devices, surveying instruments, construction equipment, etc. Additionally, GNSS receivers are often used to monitor the geographic position of high value items such as vehicles, laptop computer systems, or even packages which are being shipped. Thus, there are a wide variety of commercially available devices which utilize satellite navigation technology.

However, satellite navigation systems may be considered "dual-use" technology which means that the satellite navigation system may be used in a commercial, or military, application. As an example, a group or nation may convert a commercial satellite navigation device to a military purpose as a low-cost alternative to acquiring a military satellite navigation device with a dedicated military function. This also subverts monitoring of weapons proliferation, especially the proliferation of precision guided weapons.

Alternatively, resale of commercial products having satellite navigation components is also a problem for countries with laws prohibiting such resale. In addition
, a satellite navigation product which is intended for one market at a first cost may be resold for a profit in another market at a higher cost. This can undercut the profits of the company which originally sold the product and subvert the law of the country of manufacture, or where the operative enterprise may be domiciled.

SUMMARY OF THE INVENTION

A circuit for exclusion zone compliance is recited. In one embodiment, the circuit comprises a satellite navigation signal reception component configured for receiving at least one signal from at least one Global Navigation Satellite System satellite and a navigation data deriving component configured for deriving position data and a clock time from the at least one signal. The circuit further comprises a non-volatile memory component configured for storing an encrypted data set describing the boundaries of an exclusion zone and a data blocking component configured for controlling the accessing of the encrypted data set. The circuit further comprises a data control component configured for blocking the output of a signal from the circuit in response to either of an indication that the circuit is located within the exclusion zone and an indication that output of the signal is not permitted based upon the clock time.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 1A is a block diagram of a circuit for exclusion zone compliance in accordance with embodiments of the present invention.

DETAILED DESCRIPTION OF THE PREFERRED EMBODIMENT

Figure 1B:
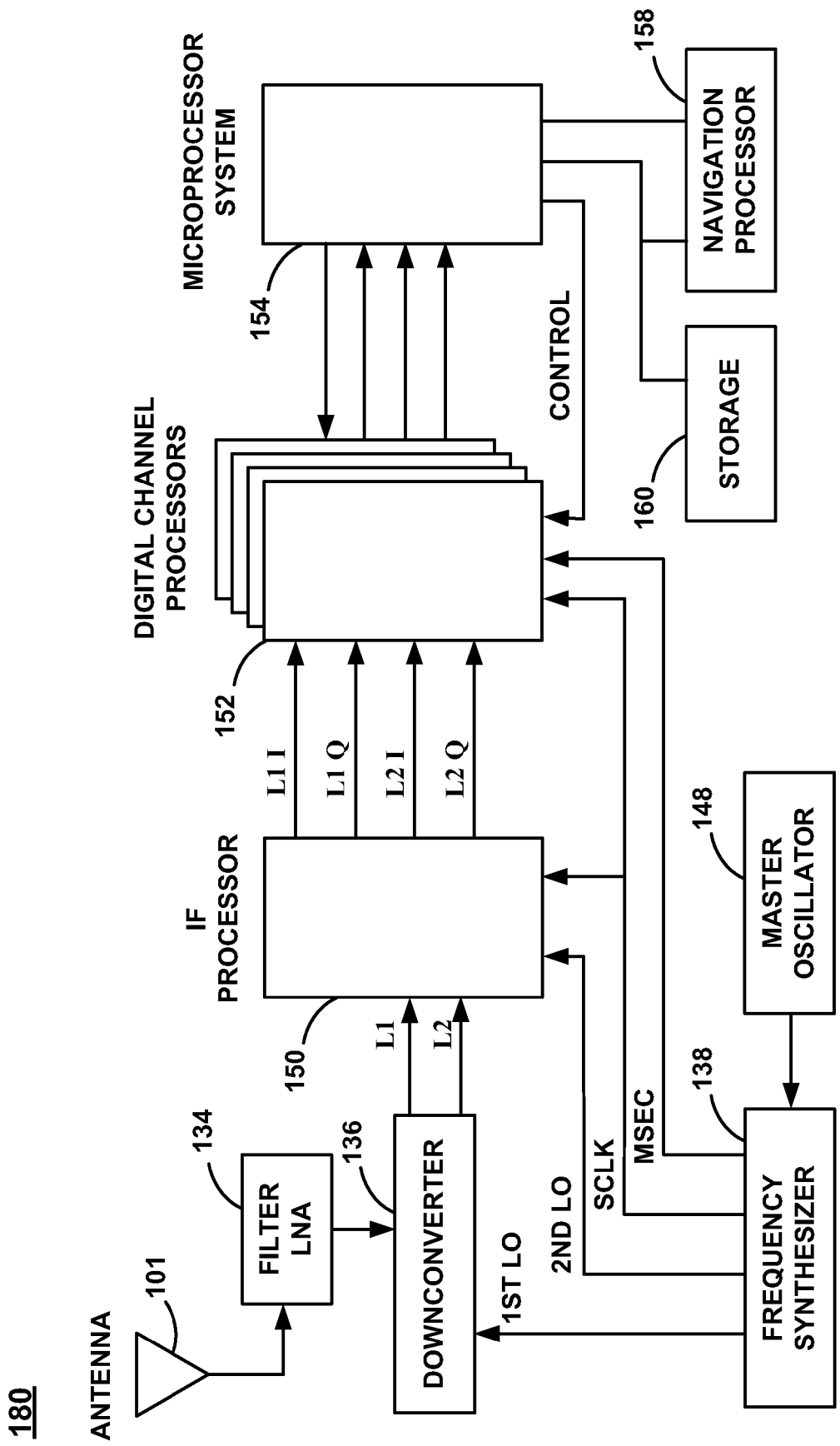
FIG. 1B is a block diagram of an example GNSS receiver which may be used in accordance with an embodiment of the present invention.

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "utilizing," "receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1A is a block diagram of a circuit 100 for exclusion zone compliance in accordance with embodiments of the present invention. In embodiments of the present invention, circuit 100 may be a component of a dedicated position determining device such as a surveying receiver capable of high precision and high accuracy positioning, a personal navigation system, an in-vehicle navigation system for use in personal driving, or for use in guiding a farm vehicle or a military vehicle, a tracking device, a specialized guidance device whereby a guidance vector is created between the current location and a desired location, or the like. In other embodiments, circuit 100 is not a component of a dedicated position determining device, but is a component which provides position determining functionality for an electronic device. For example, cellular telephones, PDAs, and automobiles are increasingly equipped with some form of GNSS capability in order to provide a user with geographic positioning and position-based information.

In one embodiment, circuit 100 comprises a satellite navigation signal reception component 102 which is communicatively coupled with an antenna 101. It is noted that while antenna 101 is shown disposed outside of circuit 100, it can also comprise a component of circuit 100 in an embodiment of the present invention. In one embodiment, satellite navigation signal reception component 102 comprises a Global Navigation Satellite System (GNSS) baseband processor and Radio Frequency (RF) front-end. GNSS RF front-end components are used for receiving at least one signal from at least one GNSS satellite and for converting that signal into an intermediate frequency signal. GNSS baseband processors are used to sample the intermediate frequency signals and for acquiring and tracking the signal received from the GNSS satellites in view. The GNSS baseband processor also is used to derive timing measurements from the intermediate frequency signal from the GNSS RF front-end. The GNSS baseband processor also can determine pseudoranges, signal phases, and Doppler frequency shift data from the intermediate frequency signal. These basic functions are well known in the Global Positioning System (GPS) and GNSS arts.

Circuit 100 further comprises a navigation data deriving component 103 which is communicatively coupled with satellite navigation signal reception component 102 and with a position data serial port 105 via a data control component 104. In embodiments of the present invention, navigation data deriving component 103 is for determining the geographic position of the antenna 101 and the associated circuit 100 based upon the data from satellite navigation signal reception component 102. In one embodiment, circuit 100 comprises a non-volatile memory 130 for persistent storage of digital information and instructions for circuit 100. In one embodiment, non-volatile memory 130 is used for storing the operating system for circuit 100. In one embodiment, this may include, but is not limited to, instructions and data for satellite navigation reception component 102, navigation data deriving component 103, data control component 104, data blocking component 120, microprocessor system 154 of FIG. 1B, and navigation processor 158 of FIG. 1B.

In embodiments of the present invention, data control component 104 is for blocking the output of a signal from navigation data deriving component 103 in response to determining that circuit 100 is located within an exclusion zone. In one embodiment, navigation data deriving component 103 compares the current geographic position of circuit 100 against a data set (131) of coordinates of at least one exclusion zone. In another embodiment, data control component 104 receives the current geographic position of circuit 100 from navigation data deriving component 103 and accesses the encrypted data set 131 for the coordinates defining the exclusion zone(s). Position data control 104 then determines whether circuit 100 is currently located within an exclusion zone. For the purposes of the present invention, an exclusion zone is a geographic region in which GNSS positioning data is not to be made accessible, outside the confines of the packaged circuit of circuit 100. In embodiments of the present invention, if it is determined that circuit 100 is currently located within an exclusion zone, navigation data deriving component 103 generates a signal to data control component 104 which indicates that circuit 100 is currently located within an exclusion zone.

In response to an indication that circuit 100 is currently located within an exclusion zone, data control component 104 blocks the output of a signal from navigation data deriving component 103. In embodiments of the present invention, data control component 104 can block the output of satellite navigation signals received from antenna 101, unprocessed position data such as timing data, pseudoranges, signal phases, Doppler signal shifts, a control signal, or a geographic position derived by navigation data deriving component 103. In so doing, circuit 100 is no longer usable for supplying geographic position data while it is located within an exclusion zone.

In one embodiment, position data control 104 will permanently block the output of a signal from navigation data deriving component 103 in response to an indication that circuit 100 is located within an exclusion zone. For example in one embodiment, position data control is configured such that it cannot be reset once it blocks the output of a signal from navigation data deriving component 103. In other words, once position data control 104 blocks the output of a signal from navigation data deriving component 103, it cannot be reset to later facilitate conveying a signal from navigation data deriving component 103. Thus, once it has been determined that circuit 100 is within an exclusion zone, it is permanently disabled and cannot be used to receive navigation signals, or to output data used for determining a geographic position. In another embodiment, position data control 104 is configured to output a signal to another device (e.g., circuit 300 of FIG. 3) which will disable circuit 100, or otherwise prevent it from outputting a signal. In another embodiment, position data control 104 is configured to output a signal to non-volatile memory 130 such that it can no longer output the data and instructions necessary for circuit 100 to function.

In another embodiment, position data control 104 only blocks the output of a signal from navigation data deriving component 103 while circuit 100 is currently located in an exclusion zone. In other words, if circuit 100 is moved from an exclusion zone to an area outside of the exclusion zone, position data control 104 will permit navigation data deriving component 103 to output a signal via position data serial port 105. It is noted that position data control 104 may be implemented within navigation data deriving component 103 in one embodiment of the present invention.

In one embodiment, encrypted data set 131 is stored in a non-volatile memory 130. In one embodiment, non-volatile memory 130 comprises a read-only memory (ROM) device. In other words, encrypted data set 131 is permanently stored in non-volatile memory 130 and cannot be updated. In another embodiment, non-volatile memory 130 comprises a programmable memory device such as a Flash memory or the like. Thus, in one embodiment, encrypted data set 131 can be updated to include additional exclusion zones as they are identified, or to remove exclusion zones as desired.

In the embodiment of FIG. 1A, navigation data deriving component 103 and data control component 104 are communicatively coupled with non-volatile memory 130 via a data blocking component 120. Data blocking component 120 controls the accessing of encrypted data set 131 from non-volatile memory 130. As shown in FIG. 1C, data blocking component 120 comprises a checksum determining component 121, and a checksum comparison component 122.

In one embodiment, checksum determining component 121 is for determining the checksum value 121a of encrypted data set 131. This checksum value 121a is then passed to checksum comparison 122 which compares the checksum value 121a with a checksum value 132 stored in non-volatile memory 130. In one embodiment, checksum value 132 is a checksum value of encrypted data set 131 when it is first stored in non-volatile memory 130. If encrypted data set 131 is then altered after it has been stored in non-volatile memory 130, checksum value 121a, as determined by checksum determining component 121, will no longer match the checksum 132. Thus, checksum comparing component 122 can determine if encrypted data set 131 has been altered after it has been stored in non-volatile memory 130.

In one embodiment of the present invention, if checksum comparing component 122 determines that checksum value 121a does not match the checksum value 132, data blocking component 120 will prevent accessing of encrypted data set 131 by navigation data deriving component 103 and/or data control component 104. In one embodiment, if data control component 104 cannot access encrypted data set 131, it automatically blocks the output of a signal from navigation data deriving component 103. In so doing, embodiments of the present invention can authenticate the integrity of encrypted data set 131 and prevent alteration of the exclusion zones. Thus, if an entity tries to circumvent the exclusion zone features of circuit 100 by changing the coordinates of one or more exclusion zones, data blocking component 120 renders circuit 100 unusable because necessary data for determining the geographic position of circuit 100 is not accessible.

Figure 1C:
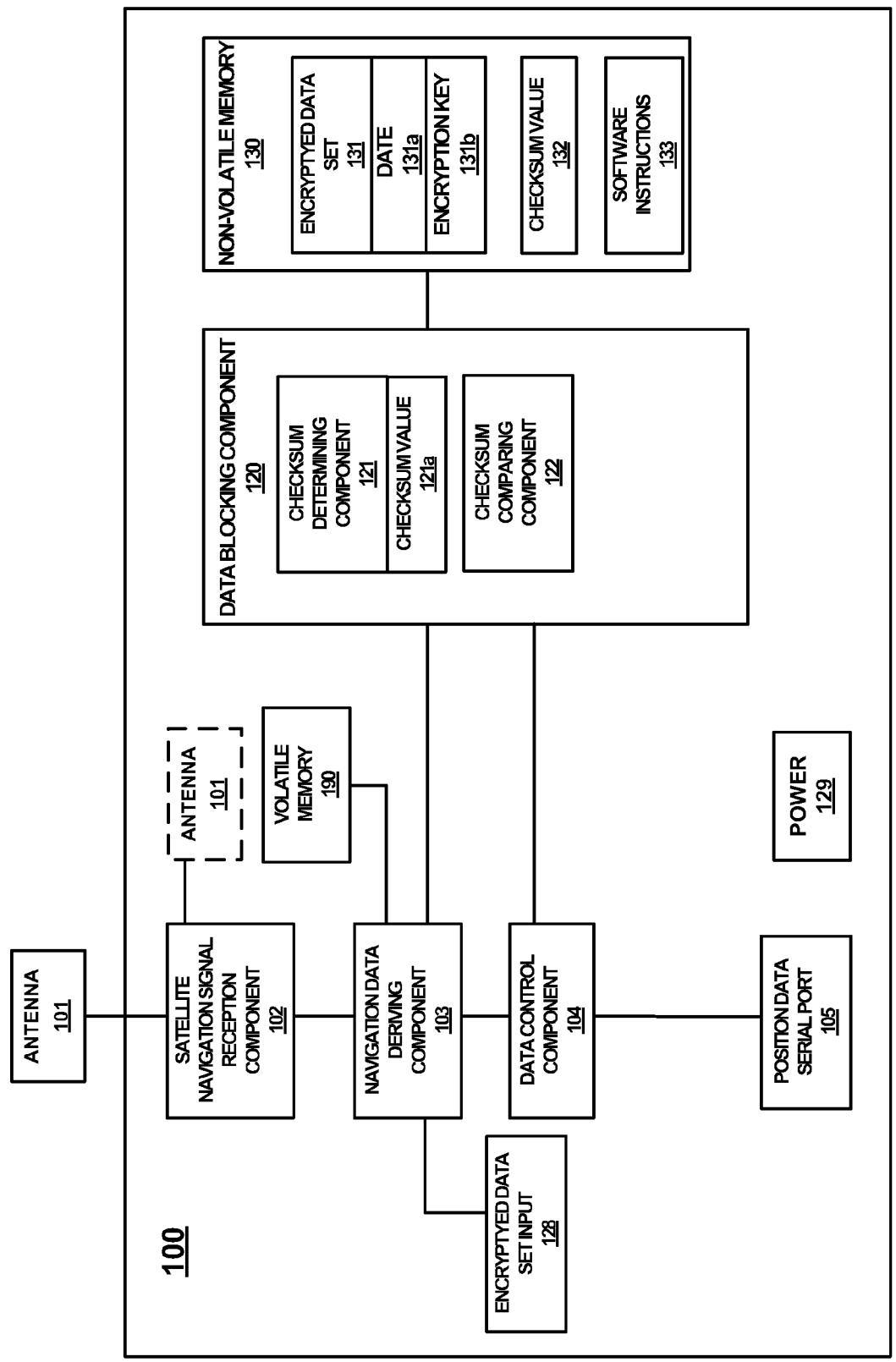
FIG. 1C is a block diagram of a circuit for exclusion zone compliance in accordance with embodiments of the present invention.
Figure 1D:
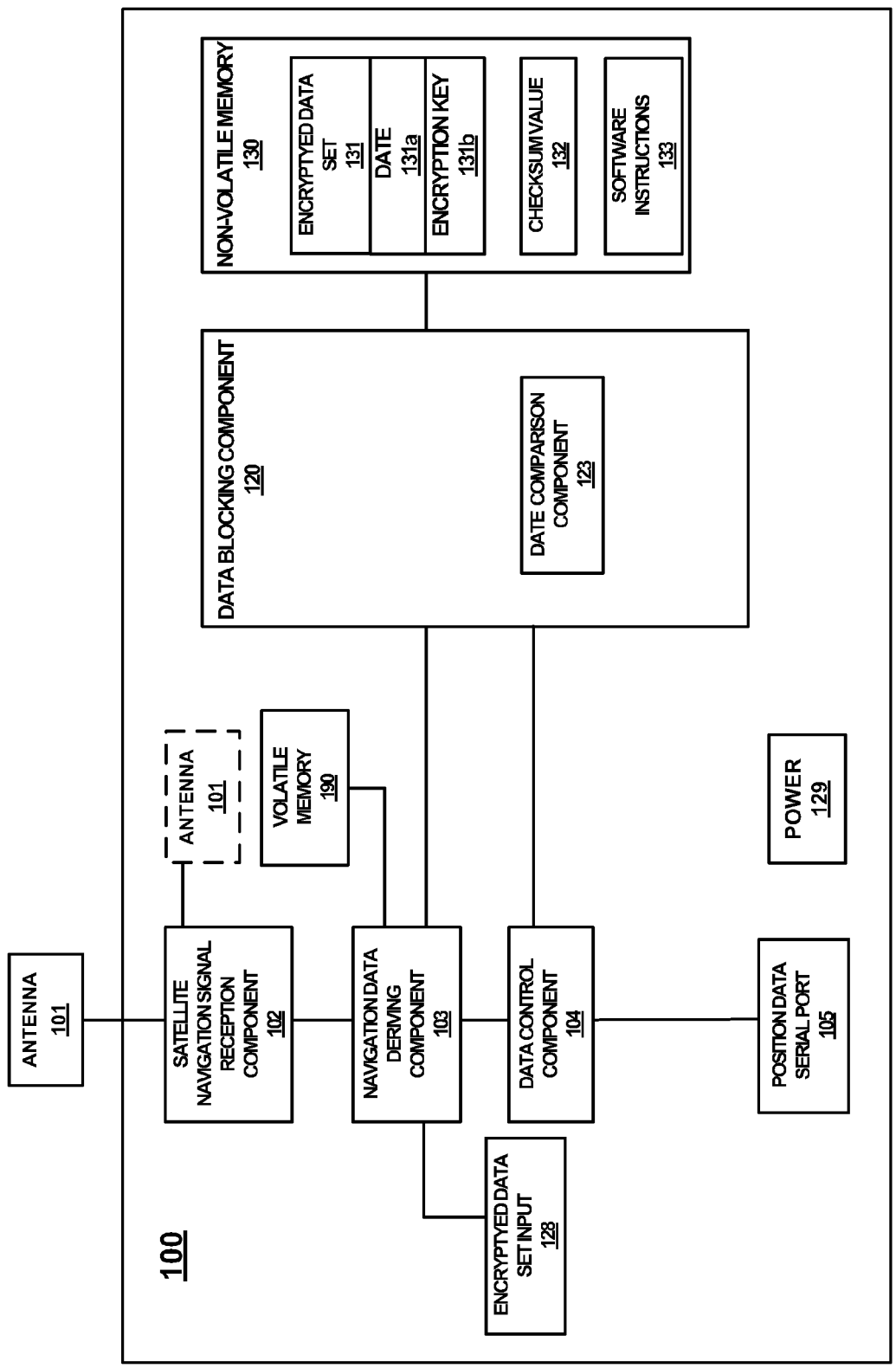
FIG. 1D is a block diagram of a circuit for exclusion zone compliance in accordance with embodiments of the present invention.

In the embodiment of FIG. 1D, data blocking component 120 comprises a date comparison component 123 for comparing a date associated with encrypted data set 131 with a second date corresponding to a valid data set. In one embodiment of the present invention, a date 131a is associated with encrypted data set 131 which facilitates determining whether a valid, or current, data set is used to define exclusion zones. It is noted that date 131a can comprise the current day, week, month, and year as well as a time of day (e.g., 1 PM Eastern Standard Time) in one embodiment. In another embodiment, encrypted data set 131 is required to be periodically updated in order to reflect any changes to the coordinates of the exclusion zones. As described above, this may include adding more exclusion zones, or removing some exclusion zones. In one embodiment, an updated data set may be received via a wireless network. In another embodiment, an updated data set may require that a removable data storage medium (e.g., a Smart Card, Universal Serial Bus (USB) drive, SmartMedia card, MultiMedia card, MicroDrive™ device, Compact-Flash™ device, MemoryStick device, SecureDigital card, optical data storage device, or the like) is communicatively coupled with navigation data deriving component 103 via encrypted data set input 128.

In one embodiment, date comparison component 123 can be used to prevent the output of time sensitive data via circuit 100. For example, an exclusion zone list may only be valid until a certain date. In one embodiment, the exclusion zone list is encrypted and stored in non-volatile memory 130 as an encrypted data set (e.g., encrypted data set 131). In one embodiment, date comparison component 123 compares the current time and date with a date attribute of the encrypted data set which describes when the encrypted data set expires, or is no longer to be made available. In one embodiment, when date comparison component 123 determines that the encrypted data set has expired, it will generate a signal to data control component 104. In response, data control component 104 blocks the output of the encrypted data set. In one embodiment, date comparison component 123 flags the encrypted data set which marks it as an expired data set.

In one embodiment of the present invention, date comparison component 123 determines whether date 131a corresponds with a valid data set. For example, if there is a requirement to update encrypted data set 131 monthly, date comparison component 123 determines whether encrypted data set 131 has been updated within the last month. In one embodiment, if date comparison component 123 determines that encrypted data set 131 is not a valid data set, data blocking component 120 will prevent accessing of encrypted data set 131 by navigation data deriving component 103 and/or data control component 104. Again, this will prevent the operation of circuit 100. Thus, if an entity tries to circumvent an exclusion zone restriction by using an older data set, circuit will be rendered unusable. Additionally, data blocking component 120 may also prevent accessing of software instructions 133 by navigation data deriving component 103 and/or data control component 104 as well. In embodiments of the present invention, software instructions 133 may comprise an almanac which helps navigation data deriving component 103 determine where GNSS satellites are in their respective orbits. Software instructions 133 may also comprise an encryption/decryption algorithm used to encrypt and/or decrypt encrypted data set 131.

Figure 1E:
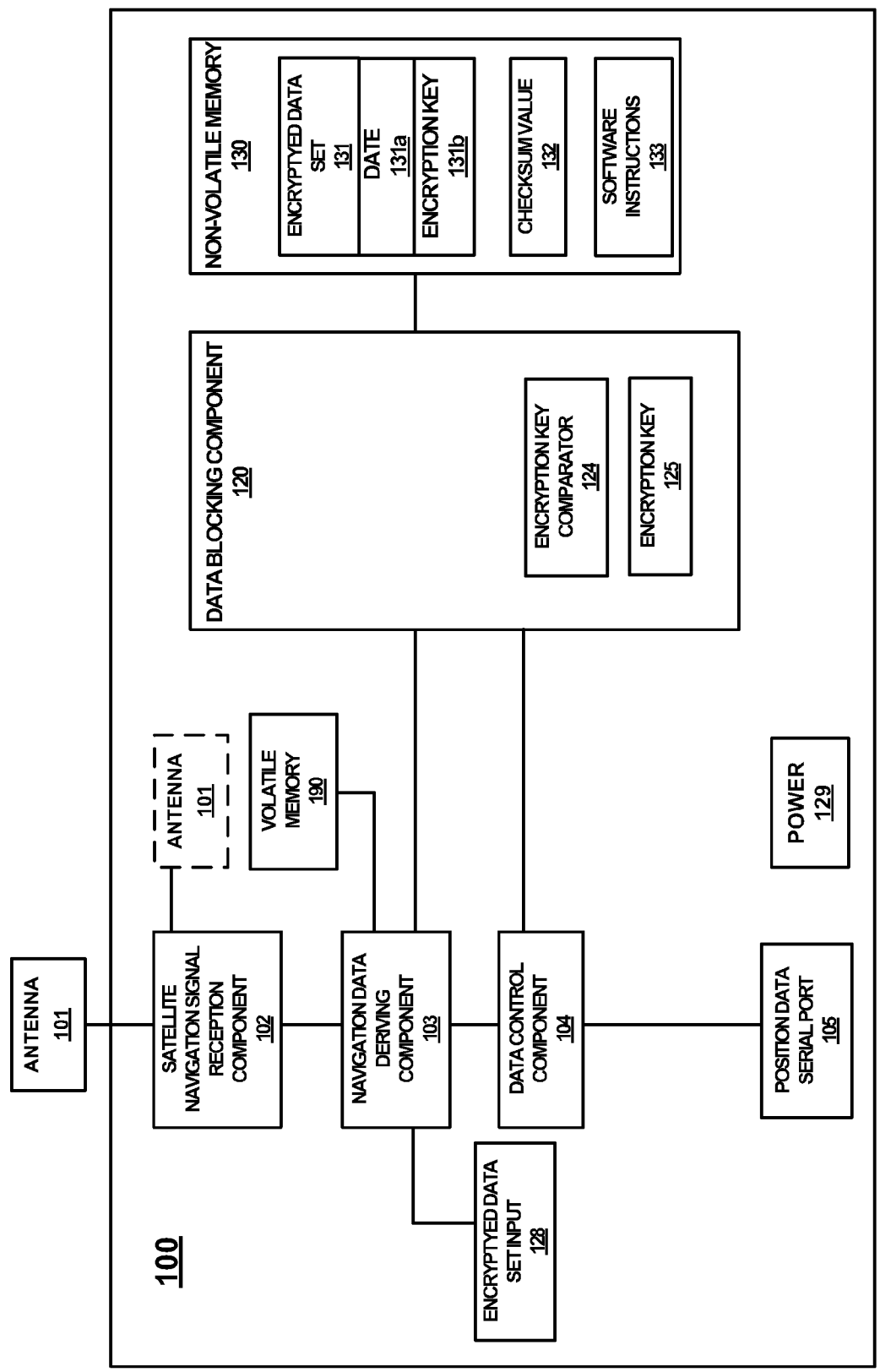
FIG. 1E is a block diagram of a circuit for exclusion zone compliance in accordance with embodiments of the present invention.

In FIG. 1E, circuit 100 further comprises an encryption key comparator 124 for comparing a stored encryption key 125 with an encryption key 131b associated with encrypted data set 131. In one embodiment, encrypted data set 131 is encrypted using standard encryption techniques, e.g., Message Digest algorithm 5 (MD-5), Secure Hash Algorithms (SHA), etc. In one embodiment, a private key (e.g., encryption key 125) is loaded into circuit 100 during production. Thus, encryption key 125 is inaccessible to a user of circuit 100. In one embodiment, encryption key 125 may comprise a portion of a larger encrypted sequence stored in circuit 100. For example, a 64-bit sequence may be stored. However, encryption key 125 may only comprise a 32-bit sequence within that 64-bit sequence. This makes it harder for an end user to determine what portion of the stored sequence is the actual encryption key 125. It is noted that encryption key 125 may be stored in navigation data deriving component 103, non-volatile memory 130, or volatile memory 190 in embodiments of the present invention. It is further noted the volatile memory 190 can also be used to store data and instructions for navigation data deriving component 103 and data control component 104.

In one embodiment of the present invention, encryption key comparator 124 compares stored encryption key 125 with encryption key 131b prior to loading encrypted data set 131 into non-volatile memory 130. In one embodiment, encryption key 131b is used to encrypt encrypted data set 131 prior to it being loaded into non-volatile memory 130 via encrypted data set input 128. In one embodiment, stored encryption key 125 and encryption key 131b are both encrypted themselves. In one embodiment, if stored encryption key 125 does not match encryption key 131b which is within encrypted data set 131, data blocking component 120 prevents the loading of encrypted data set 131 into said non-volatile memory 130. If stored encryption key 125 does match encryption key 131b which is within encrypted data set 131, encryption key 125 is used to decrypt encrypted data set 131 prior to its being accessed by navigation data deriving component 103 and/or data control component 104. This facilitates authenticating encrypted data set 131 prior to loading it into non-volatile memory 130.

Figure 1F:
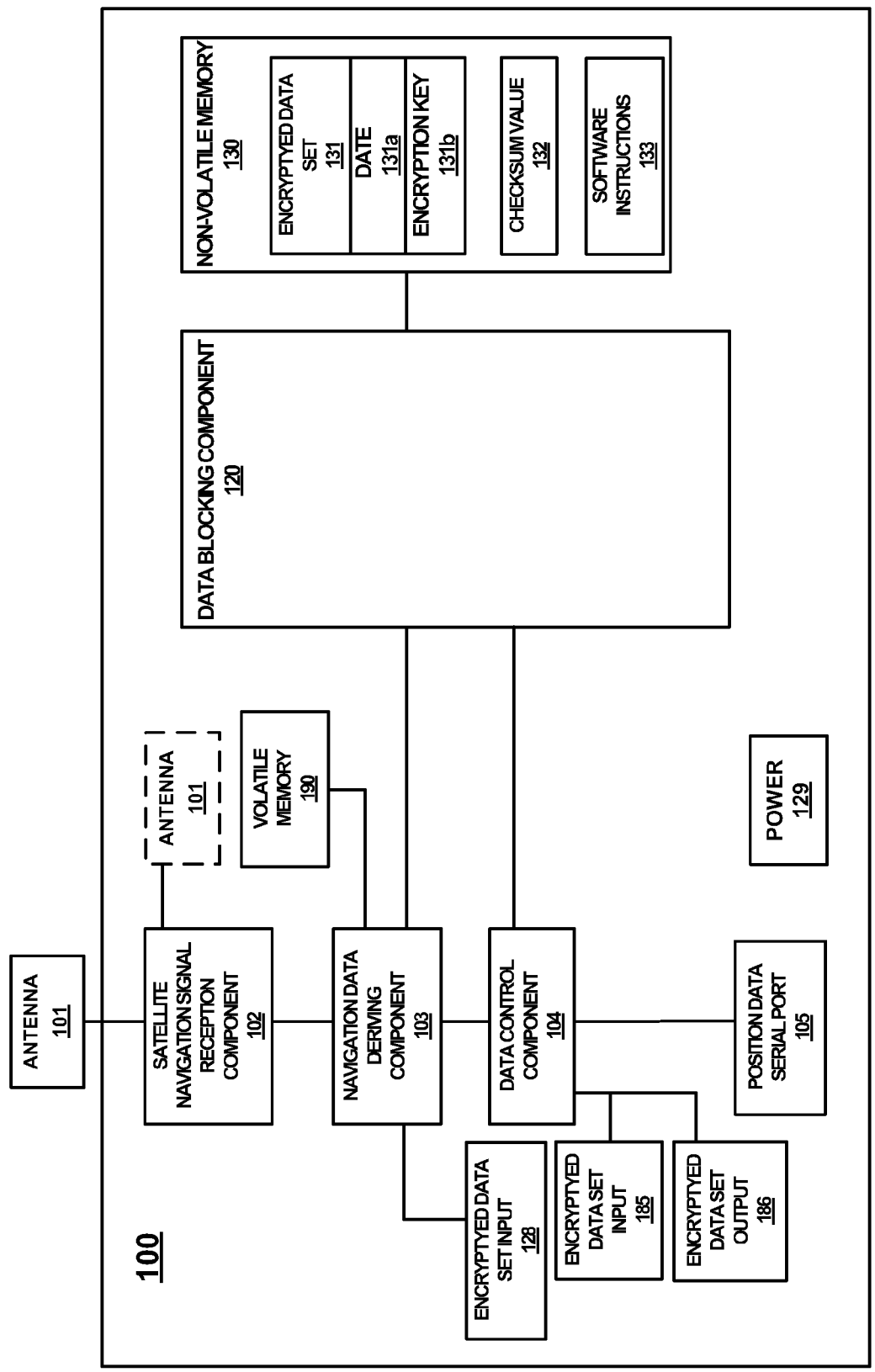
FIG. 1F is a block diagram of a circuit for exclusion zone compliance in accordance with embodiments of the present invention.

In FIG. 1F, circuit comprises an encrypted data set input 185 and an encrypted data set output 186 which are communicatively coupled via data control component 104. In one embodiment, circuit 100 can be used to control the output of data from a device to which circuit is communicatively coupled. For example, circuit 100 can be communicatively coupled with a cellular telephone, a handheld computer system such as a Personal Digital Assistant (PDA), a laptop computer system, a general purpose computer system, or other electronic device. In one embodiment, data from a device to which circuit 100 is coupled passes through circuit 100 prior to its output. Thus, data cannot be displayed, downloaded, shared, copied, or accessed unless it passes via circuit 100 first. In one embodiment, circuit 100 can be used to control the output of data from an electronic device to which it is coupled. For example, in one embodiment circuit 100 can be used to prevent the output of data based upon the geographic position determined by navigation data deriving component 103. In other words, if it is determined that circuit 100 is within an exclusion zone, the output of data from circuit 100 will be blocked by data control component 104.

In one embodiment, the data blocked by data control component 104 comprises, but is not limited to, navigation data from navigation data deriving component 103, data stored in volatile memory 190, data stored in non-volatile memory 130, or data which is input to circuit 100 via encrypted data set input 165. In one embodiment, the encryption key used to decrypt data input from encrypted data input 185 is stored in circuit 100. As described above, circuit can be used to decrypt an encrypted data set determining whether a stored data set has been altered subsequent to its being stored in circuit 100. It is noted that there is no requirement for data input via encrypted data set input 165 to be encrypted in one embodiment. As will be explained in greater detail below, the data described above may be blocked from being output by circuit 100 based upon the date, or current time, or based upon the speed at which circuit 100 is moving, or a combination thereof in one embodiment. The use of date, time, and/or speed to determine whether data is output by circuit 100 can be used in conjunction with a geographic position of circuit 100 in one embodiment.

Figure 1G:
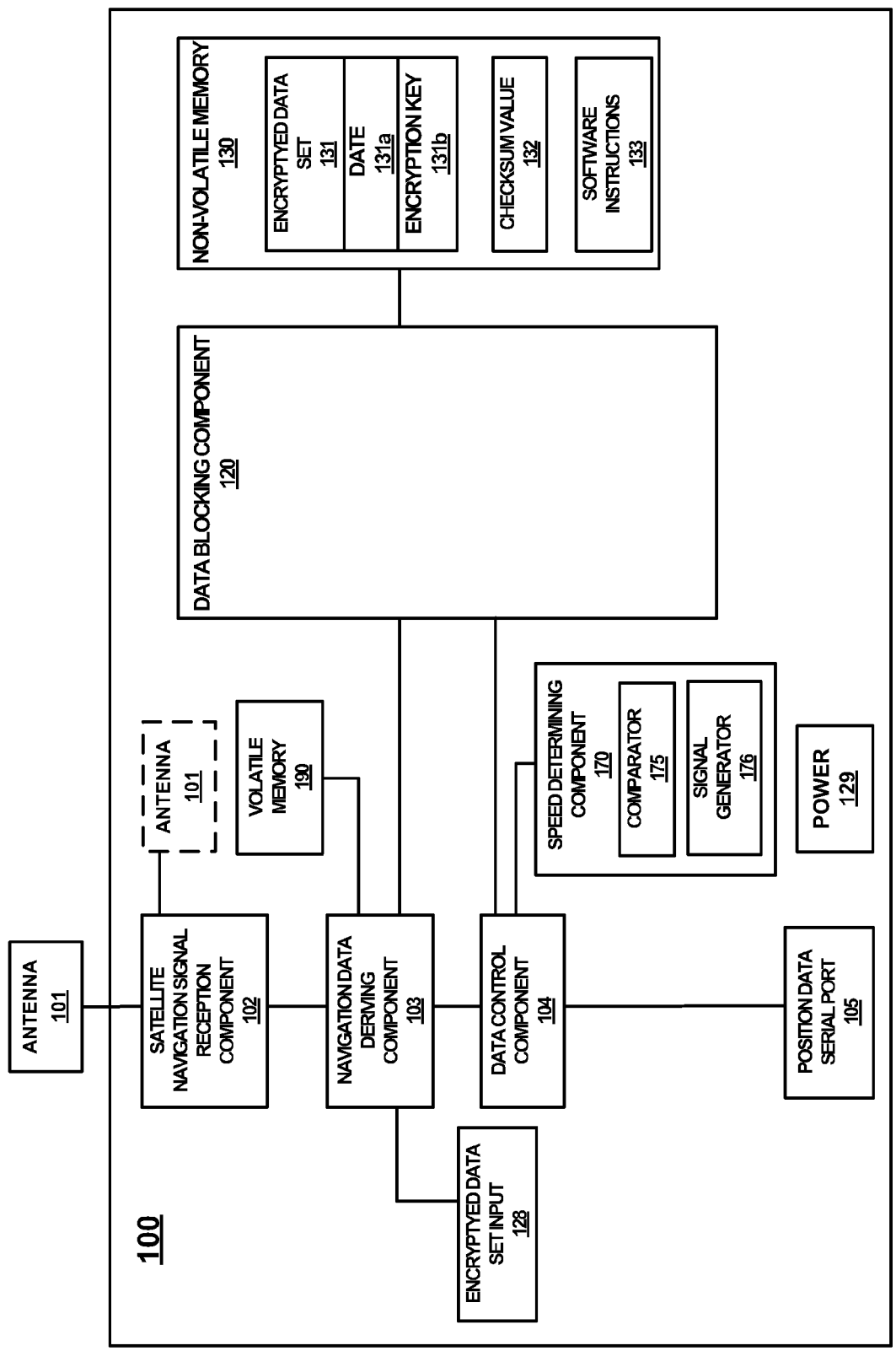
FIG. 1G is a block diagram of a circuit for exclusion zone compliance in accordance with embodiments of the present invention.

In FIG. 1G, circuit 100 comprises a speed determining component 170. In one embodiment, speed determining component 170 is configured to determine the speed of circuit 100. In one embodiment, speed determining component 170 receives position data from navigation data deriving component 103 and determines if circuit is exceeding a pre-determined speed threshold. For example, in one embodiment speed determining component 170 can receive successive measurements of the geographic position of circuit 100 from navigation data deriving component 103. Based upon the time interval of the successive measurements of geographic position, speed determining component 170 can then determine the speed of circuit 100. It is noted that other methods may be used by speed determining component 170 as well. For example, speed determining component 170 may also be configured to determine the speed of circuit 100 based upon an analysis of the Doppler shift of received satellite navigation signals due to motion of circuit 100. The speed of circuit 100 is compared with a pre-determined speed threshold to determine if circuit 100 is moving, or is moving faster than the speed threshold. It is noted that the speed threshold 390 can be set to comply with export control regulations. For example, one standard for export control of sensitive technology does not permit the export of a satellite navigation device which is capable of providing navigation information at speeds in excess of 600 meters/second. Thus, in one embodiment the speed threshold 390 is set at a minimum of 600 meters/second. It is noted that the speed threshold 390 can be set at a limit lower than 600 meters/second. For example, if speed threshold 390 is set at a speed of 8 miles per hour, it may be assumed that mobile electronic device 100 is being operated by a user in a moving vehicle when its speed exceeds 8 miles per hour. Alternatively, it may be assumed that the user of mobile electronic device 100 is engaged in an activity which requires a greater attention to safety. In one embodiment, speed determining component 170 uses signal generator 175 to generate a signal to data control component 104 when the speed of circuit 100 exceeds the speed threshold. In response to the signal from speed determining component 170 data control component 104 blocks the output of a signal from circuit 100.

In another embodiment, speed comparator 170 may perform a comparison of the expected GNSS Doppler frequency shift measurements from a remote source and GNSS Doppler frequency shift measurements performed by circuit 100 to determine the speed of circuit 100. In one embodiment, Assisted-GPS (A-GPS) technology is used to facilitate the process of determining the position of circuit 100. A-GPS is a system in which outside sources provide a GPS receiver with data permitting the receiver to find GPS satellite signals more readily than can be done on a stand alone basis. The data is derived from a GNSS receiver which is remotely located from the circuit 100 and provides the A-GPS data to the circuit. Because of the proximity of the GNSS receiver to circuit 100, GNSS signal data such as code phases, Doppler frequency shifts, etc., as well as locally signal errors due to atmospheric or physical conditions should be approximately the same for both the GNSS receiver and circuit 100. By sending this information to circuit 100, the time to fix and track GNSS satellites is greatly reduced for circuit 100. The A-GPS system is widely used to comply with the wireless E911 standard which mandated that cellular telephone position information be made available to emergency call dispatchers because it permits a cellular telephone to generate a position fix quicker than if an autonomous position fix was being generated.

Because GPS, and other GNSS navigation systems, rely upon a plurality of satellites which broadcast a unique code, GNSS receivers must determine which codes are being received at a particular location. The receiver must correlate the received C/A code with a stored version and then determine a time delay between when the C/A code was broadcast and when it was received by the receiver. Because the satellite is constantly moving with reference to the receiver, a Doppler shift of the frequency of the C/A code is encountered which can hinder acquisition of the satellite signals because the receiver has to search for the frequency of the C/A code. As a result, it can take minutes for a GPS receiver to create an initial position fix autonomously.

Figure 5:
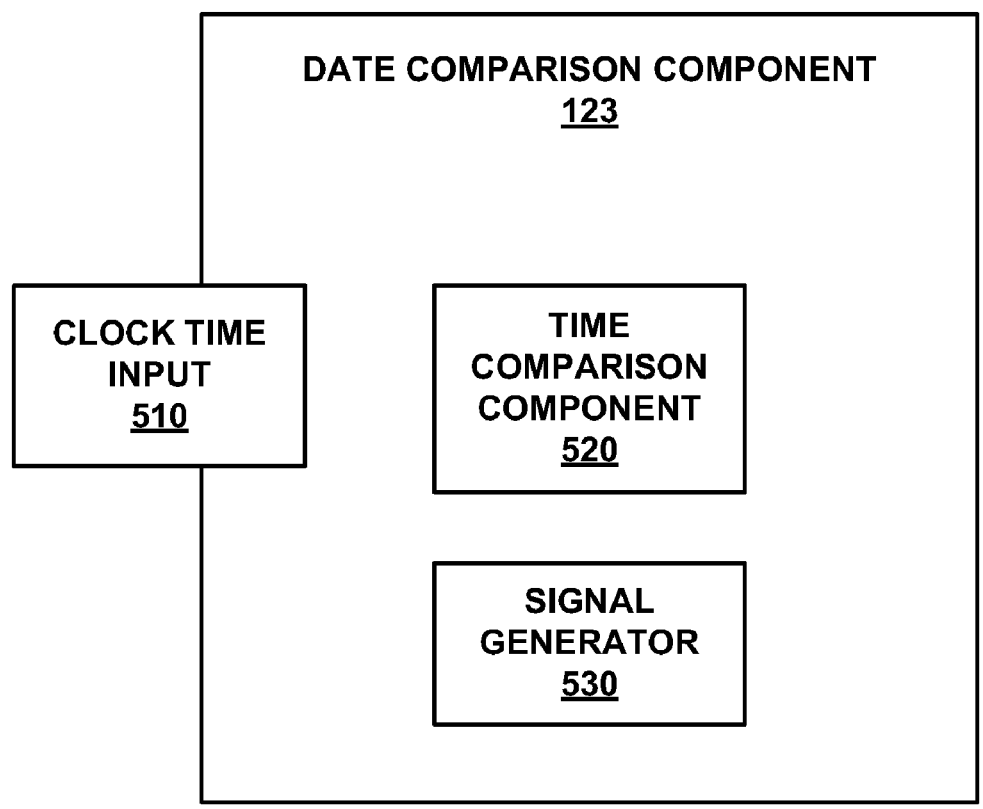
FIG. 5 is a block diagram of a date comparison component in accordance with an embodiment of the present invention.

A-GPS was developed to overcome the difficulties in acquiring a signal and to speed the time it takes a receiver to generate a position fix. Due to the proximity of the GPS receiver at the cellular base station to the location of a cellular telephone, the GNSS Dopplers, GNSS code phases, and satellite bit times at the cellular base station (e.g., 510 of FIG. 5) should closely approximate those of the location of the cellular telephone (e.g., mobile electronic device 100). Thus, by providing this information to the GPS receiver in the cellular telephone, the GPS receiver can acquire and track satellites better and realize an increase in signal sensitivity.

In one embodiment, navigation data deriving component 103 of circuit 100 uses the GNSS signal acquisition assistance data to more quickly acquire the satellites within view. In one embodiment, this includes, but is not limited to, synchronizing local oscillators to the desired carrier frequencies, tuning with the predicted Dopplers to account for frequency shift due to the relative motion of the satellite and circuit 100, and narrowing the code phase searches based upon the predicted GNSS code phases sent from the A-GPS system. Circuit 100 may further use a GPS time estimate for GPS data bit timing, pre-detection interval timing, generating a clock time tag for a GNSS signal, and for linearizing pseudoranges to satellites. It is noted that in one embodiment, Assisted-GPS data is not required for circuit 100 to determine its position. However, in one embodiment the use of Assisted-GPS data is beneficial in reducing the time to first fix for circuit 100.

In one embodiment, the speed of circuit 100 is performed using vector analysis. For example, in one embodiment the Doppler frequency shift of signals from each satellite in view of the A-GPS system is converted with vector arithmetic into a 3-dimensional vector. Each satellite Doppler frequency shift is equivalent by constants to a rate of change in the distance between the satellite and a GNSS receiver (e.g., of the A-GPS system, or navigation data deriving component 103 of circuit 100). The Doppler frequency shift is due to the movement of the satellite relative to the GNSS receiver of the A-GPS system or of circuit 100. Typically, three 3-dimensional Dopplers, or range rates, are converted with vector arithmetic into a 3-dimensional vector. In one embodiment, the expected 3-dimensional vector, which is calculated based upon the relative motion between a satellite and the A-GPS system, is compared with the measured Doppler frequency shift which is based upon the relative motion between the satellite and circuit 100. The difference of these two values can be attributed to the motion of circuit 100 alone as the A-GPS system is stationary. In one embodiment, speed determining component 170 uses the data sent by the A-GPS system to determine the 3-dimensional vector which describes the motion of the satellite relative to the A-GPS system. Speed determining component 170 can also use data based upon the analysis of a GNSS signal received by antenna 101 to determine the motion of circuit 100 relative to the satellite. Comparator 170 is configured to compare these two values to determine the speed of circuit 100 in one embodiment. It is noted that the functionality of speed determining component 170 is in navigation data deriving component 103 in one embodiment.

Figure 1H:
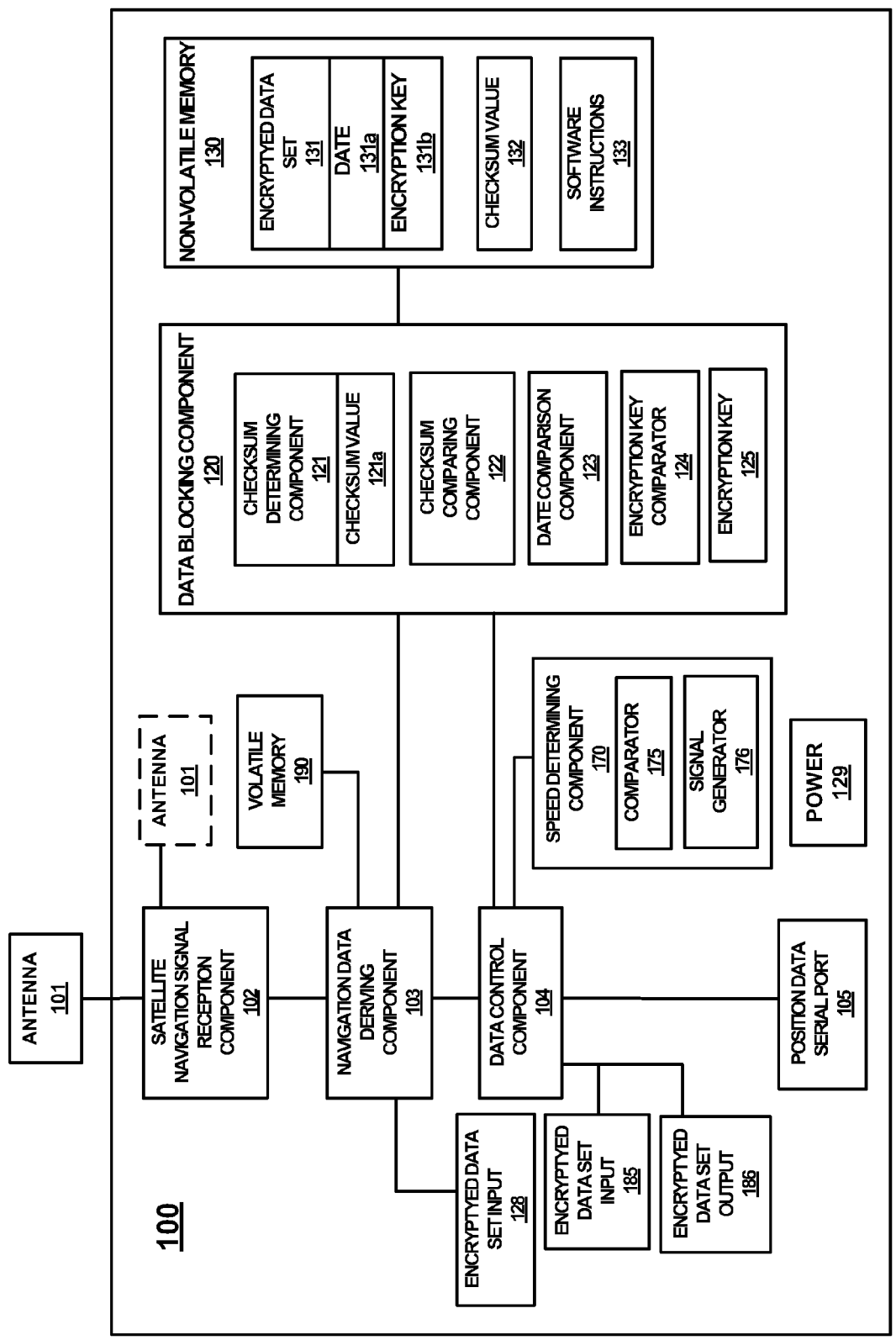
FIG. 1H is a block diagram of a circuit for exclusion zone compliance in accordance with embodiments of the present invention.

In FIG. 1H, data blocking component 120 comprises checksum determining component 121, checksum value 121a, checksum comparison component 122, date comparison component 123, encryption key comparator 124, and encryption key 125. Circuit 100 further comprises encrypted data set input 185 and an encrypted data set output 186. Circuit 100 further comprises speed determining component 170. In FIG. 1H, circuit 100 further comprises an altitude limiting component 195. In one embodiment, altitude limiting component 195 is configured to receive an indication of the altitude of circuit 100 from navigation data deriving component 103 and for comparing that altitude with a stored altitude threshold value. It is well known in the art that a GNSS receiver (e.g., navigation data deriving component 104) can also derive the altitude of a device based upon a plurality of received satellite navigation signals. In the embodiment of FIG. 1H, altitude limiting component 195 generates a signal when the altitude of circuit 100 exceeds a pre-set altitude threshold. As an example, export control regulations have restricted the export of navigation devices to devices with an altitude limit of no more than 18,000 meters. Thus, altitude limiting component 195 can be configured to generate a signal when it determines that the altitude of circuit 100 exceeds 18,000 meters. It is noted that the altitude threshold can be set to a lower altitude if so desired. In one embodiment, the altitude threshold cannot be modified after manufacture. In response to the signal generated by altitude limiting component 195, data control component 104 blocks the output of a signal from circuit 100.

It is noted that data blocking component 120 may comprise other combinations of components described above with reference to FIGS. 1C, 1D, and 1E. For example, in one embodiment data blocking component 120 comprises checksum determining component 121, checksum value 121a, checksum comparison component 122, and date comparison component 123. In one embodiment, data blocking component 120 comprises checksum determining component 121, checksum value 121a, checksum comparison component 122, encryption key comparator 124, and encryption key 125. In one embodiment, data blocking component 120 comprises date comparison component 123, encryption key comparator 124, and encryption key 125.

In FIGS. 1A, 1C, 1D, 1E, 1F, 1G, and 1H circuit 100 further comprises a power coupling 129 for supplying power to circuit 100. In one embodiment, circuit 100 operates continuously, even when a device which utilizes circuit 100 is shut down. Thus, in one embodiment circuit 100 continuously monitors its geographic position without regard to the power status of a device to which it is coupled. In one embodiment, if power to circuit 100 is interrupted, data control component 104 requires a login procedure is followed to permit the output of a signal from said navigation data deriving component 103. In one embodiment, if power to circuit 100 is interrupted, encryption key 125 is no longer usable to circuit 100. For example, encryption key 125 will be lost if it is stored in volatile memory 190 and power to circuit 100 is interrupted. Thus, to be able to render circuit 100 usable, a correct encrypted encryption key 125 has to be loaded into circuit 100. In one embodiment, a correct encryption key 125 will not be made accessible for loading into circuit 100 unless the identity of the party currently in possession of circuit 100 can be verified.

Thus, embodiments of the present invention can facilitate the export of a geographic position determining device and/or data accessible via circuit 100 while reducing the likelihood that it can be misused by, for example, commercial entities, rogue nations, or other groups. For example, if a certain government is deemed likely to misuse GNSS data, that nation may be designated as a restricted area. As a result, use of circuit 100 to determine a geographic position will be prevented. Circuit 100 may operate anywhere in the world and the exclusionary zone may be located anywhere in the world. In another embodiment, sensitive data will not be accessible unless circuit 100 is located outside of an exclusion zone. In another embodiment, time sensitive data will not be accessible via circuit when the time period for accessing that data has expired. In another embodiment, circuit 100 can be used to prevent the accessing of data, including geographic data, or data used to determine a geographic position, if circuit 100 is moving, or is moving faster than a pre-determined speed threshold. This facilitates implementing weapons proliferation controls as circuit 100 cannot be altered for use as, for example, a weapons guidance system, or used in a manner which circumvents a commercial agreement. Thus, even if an unintended third party should gain control of a properly exported version of circuit 100, that third party cannot use or alter circuit 100 for use within a designated exclusion zone.

It is further noted that circuit 100 may be implemented to enforce commercial exclusion zones in addition to other considerations which may determine exclusion zones. Thus, if an entity, such as a communications network for example, utilizes GNSS derived data, access to this data can be prevented if that entity fails to pay a royalty or other fee. Another example in which commercial exclusion zones may be implemented in accordance with the present invention is to prevent purchasing circuit 100 in a low cost region and re-selling it in a higher cost region in order to turn a profit. In embodiments of the present invention, circuit 100 limits the output of a signal from navigation data deriving component 103 to regions in which it is allowed to operate (e.g., a low cost region) to prevent unauthorized re-selling at a profit.

Additionally, in embodiments of the present invention, the designated exclusion zones may be dynamically updated to reflect changed relations. Thus, it is also possible to quickly redefine one or more of the exclusion zones to permit operation of circuit 100 within that zone. For example, if a government determines that a nation is to no longer be excluded from using circuit 100, the definition of which geographic regions are considered exclusion zones can be updated to reflect the new status of that nation. Alternatively, if the price of circuit 100, or an electronic device coupled therewith, in a previously excluded region is now comparable to the price in a second region, the definitions of the exclusion zones can be updated such that circuit 100 can be operated in the previously excluded region.

Example GNSS Receiver

With reference now to FIG. 1B, a block diagram is shown of an embodiment of an example GNSS receiver which may be used in accordance with various embodiments described herein. In particular, FIG. 1B illustrates a block diagram of a GNSS receiver in the form of a general purpose GPS receiver 180 capable of demodulation of the L1 and/or L2 signal(s) received from one or more GPS satellites. It is noted that the components described below with reference to FIG. 1B may be performed by satellite navigation signal reception component 102 and navigation data deriving component 103 described above with reference to FIG. 1A. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s). Embodiments of the present technology may be utilized by GNSS receivers which access the L1 signals alone, or in combination with the L2 signal(s). A more detailed discussion of the function of a receiver such as GPS receiver 180 can be found in U.S. Pat. No. 5,621,426. U.S. Pat. No. 5,621,426, by Gary R. Lennen, is titled "Optimized processing of signals for enhanced cross-correlation in a satellite positioning system receiver," and includes a GPS receiver very similar to GPS receiver 180 of FIG. 1B.

In FIG. 1 B, received L1 and L2 signal is generated by at least one GPS satellite. Each GPS satellite generates different signal L1 and L2 signals and they are processed by different digital channel processors 152 which operate in the same way as one another. FIG. 1B shows GPS signals (L1=1575.42 MHz, L2=1227.60 MHz) entering GPS receiver 180 through a dual frequency antenna 101. Antenna 101 may be a magnetically mountable model commercially available from Trimble® Navigation of Sunnyvale, Calif., 94085. Master oscillator 148 provides the reference oscillator which drives all other clocks in the system. Frequency synthesizer 138 takes the output of master oscillator 148 and generates important clock and local oscillator frequencies used throughout the system. For example, in one embodiment frequency synthesizer 138 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 134 performs filtering and low noise amplification of both L1 and L2 signals. The noise figure of GPS receiver 180 is dictated by the performance of the filter/LNA combination. The downconverter 136 mixes both L1 and L2 signals in frequency down to approximately 175 MHz and outputs the analogue L1 and L2 signals into an IF (intermediate frequency) processor 30. IF processor 150 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 152 inputs the digitally sampled L1 and L2 inphase and quadrature signals. All digital channel processors 152 are typically are identical by design and typically operate on identical input samples. Each digital channel processor 152 is designed to digitally track the L1 and L2 signals produced by one satellite by tracking code and carrier signals and to form code and carrier phase measurements in conjunction with the microprocessor system 154. One digital channel processor 152 is capable of tracking one satellite in both L1 and L2 channels. Microprocessor system 154 is a general purpose computing device which facilitates tracking and measurements processes, providing pseudorange and carrier phase measurements for a navigation processor 158. In one embodiment, microprocessor system 154 provides signals to control the operation of one or more digital channel processors 152. Navigation processor 158 performs the higher level function of combining measurements in such a way as to produce position, velocity and time information for the differential and surveying functions. Storage 160 is coupled with navigation processor 158 and microprocessor system 154. It is appreciated that storage 160 may comprise a volatile or non-volatile storage such as a RAM or ROM, or some other computer readable memory device or media. It is noted that in one embodiment, the output from any of digital channel processors 152, microprocessor system 154, and navigation processor 158 may be communicatively coupled with data control component 104 of FIG. 1A. In one embodiment, GPS receiver 180 is configured to output a signal when the L1 and/or L2 signals from at least one GPS satellite cannot be accessed, or detected, by GPS receiver 180. In response to this signal, data control component 104 will automatically block the output of a signal from circuit 100. This is to prevent bypassing the data blocking functions of circuit 100 by preventing navigation data deriving component from determining the geographic position of circuit 100.

One example of a GPS chipset upon which embodiments of the present technology may be implemented is the Copernicus™ chipset which is commercially available from Trimble® Navigation of Sunnyvale, Calif., 94085. Other examples of a GPS chipsets upon which embodiments of the present technology may be implemented are the SiRFstar III™ GSC3e/LP and GSC3f/LP chipsets which are commercially available from SiRF® Technology Inc., of San Jose, Calif., 95112. In other words, the Copernicus™ and SiRFstar III™ chipsets may integrate components of circuit 100 in order to control the regions in which the GPS receiver is operational.

It is noted that in one embodiment the components of circuit 100 shown in FIGS. 1A, 1C, 1D, 1E, 1F, 1G, and 1H are a plurality of discreet components disposed upon a printed circuit board. In other words, circuit 100 is implemented as a plurality integrated circuits of the chipset of a satellite navigation device. In another embodiment, the components of circuit 100 are implemented as a single integrated circuit chip. Furthermore, in one embodiment the components of circuit 100 discussed above may be filled surrounded by an epoxy during manufacturing to make physical tampering with these components (e.g., altering wires, connections, ports, etc.) more difficult. It is noted that the filling or surrounding with epoxy may not extend to the RF components of circuit 100 and/or GPS receiver 180 of FIG. 2.

Figure 2:
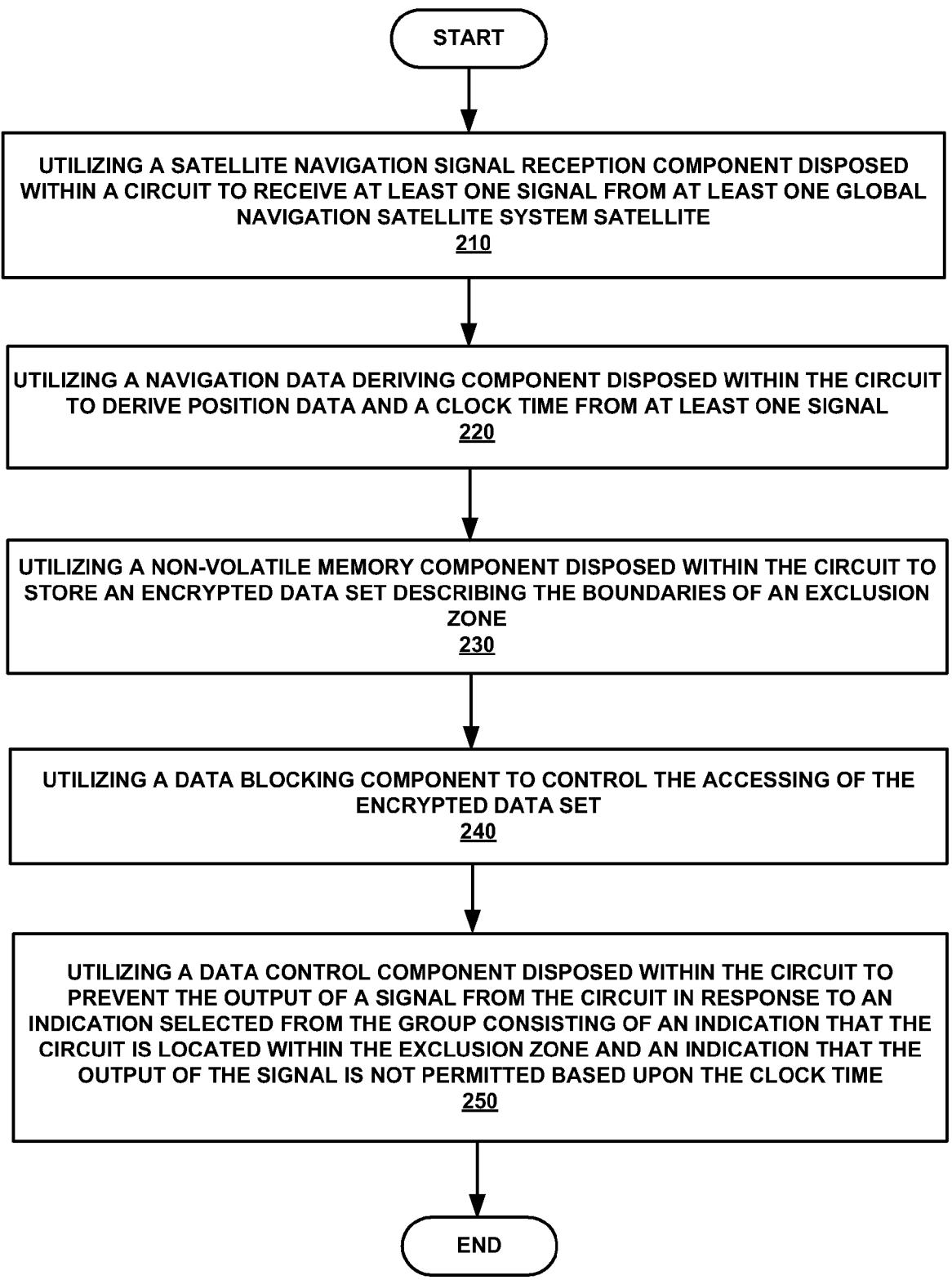
FIG. 2 is a flowchart of a method for implementing an exclusion zone of a GNSS receiver in accordance with an embodiment of the present invention.

FIG. 2 is a flowchart of a method 200 for implementing exclusion zone compliance in accordance with one embodiment of the present invention. In operation 210 of FIG. 2, a satellite navigation signal reception component disposed within a circuit is utilized for receiving at least one signal from at least one Global Navigation Satellite System satellite. As discussed above, satellite navigation signal reception component 102 of circuit 100 is used for receiving at least one signal from at least one GNSS satellite and for converting that signal into an intermediate frequency signal. Satellite navigation signal reception component 102 is also used to sample the intermediate frequency signals and acquire and track the signal received from the GNSS satellites in view. Satellite navigation signal reception component 102 is also used to derive timing measurements from the intermediate frequency signal and determine pseudoranges, signal phases, and Doppler frequency shift data from the intermediate frequency signal.

In operation 220 of FIG. 2, a navigation data deriving component disposed within circuit 100 is utilized to derive position data and a clock time from the at least one signal. As discussed above, navigation data deriving component 103 is for determining the geographic position of circuit 100 based upon the data from satellite navigation signal reception component 102. Typically, that geographic position, or unprocessed navigation data such as received satellite navigation signals, derived timing measurements, pseudoranges, signal phases, and Doppler frequency shift data is output by circuit 100. This information can be used to control a device based upon its geographic position, or to simply report the geographic position of a user of circuit 100.

In operation 230 of FIG. 2, a non-volatile memory component disposed within the circuit is utilized to store an encrypted data set describing the boundaries of an exclusion zone. As described above, non-volatile memory 130 may comprise a read-only memory, or a programmable non-volatile memory device used to store encrypted data set 131. In one embodiment, encrypted data set 131 cannot be updated or changed when non-volatile memory 130 is a read-only memory device. In another embodiment, encrypted data set 131 can be updated when stored in a programmable non-volatile memory device.

In operation 240 of FIG. 2, a data blocking component communicatively coupled with the non-volatile memory device and the navigation data deriving component is utilized to control the accessing of the encrypted data set. As described above, navigation data deriving component 103 and data control component 104 are communicatively coupled with non-volatile memory 130 via a data blocking component 120. Data blocking component 120 controls the accessing of encrypted data set 131 from non-volatile memory 130. Data blocking component controls the accessing of encrypted data set 131 based upon a comparison of checksum values, current date and/or time, a comparison of encryption keys, or a combination thereof. In one embodiment, when data blocking component prevents the accessing of encrypted data set 131, which prevents a comparison of the current geographic position of circuit 100 with the exclusion zone description stored as encrypted data set 131. In one embodiment, if a comparison of the present geographic position of circuit 100 with the exclusion zone description cannot be performed, data control component 104 prevents the output of a signal from circuit 100.

In operation 250 of FIG. 2, a data control component disposed within circuit 100 is utilized to prevent the output of a signal from the circuit 100 in response to an indication selected from the group consisting of: an indication that said circuit is located within the exclusion zone and an indication that output of said signal is not permitted based upon the clock time. As discussed above, if data control component 104 receives an indication that circuit 100 is located within an exclusion zone, data control component 104 prevents the output of a signal from navigation data deriving component 103 outside of circuit 100. In so doing, data control component 104 renders circuit 100 unusable as a position determining component within any exclusion zones identified by encrypted data set 131. Embodiments of the present invention are advantageous over other exclusion zone solutions because it is implemented as a circuit rather than a software implemented solution. This makes it more difficult to circumvent exclusion zone restrictions, export control restrictions, or commercial restrictions, on the operation of a device based upon its geographic position. Additionally, embodiments of the present invention facilitate authentication of the data set used to identify exclusion zones which therefore makes circumventing the geographic restrictions more difficult.

Figure 3:
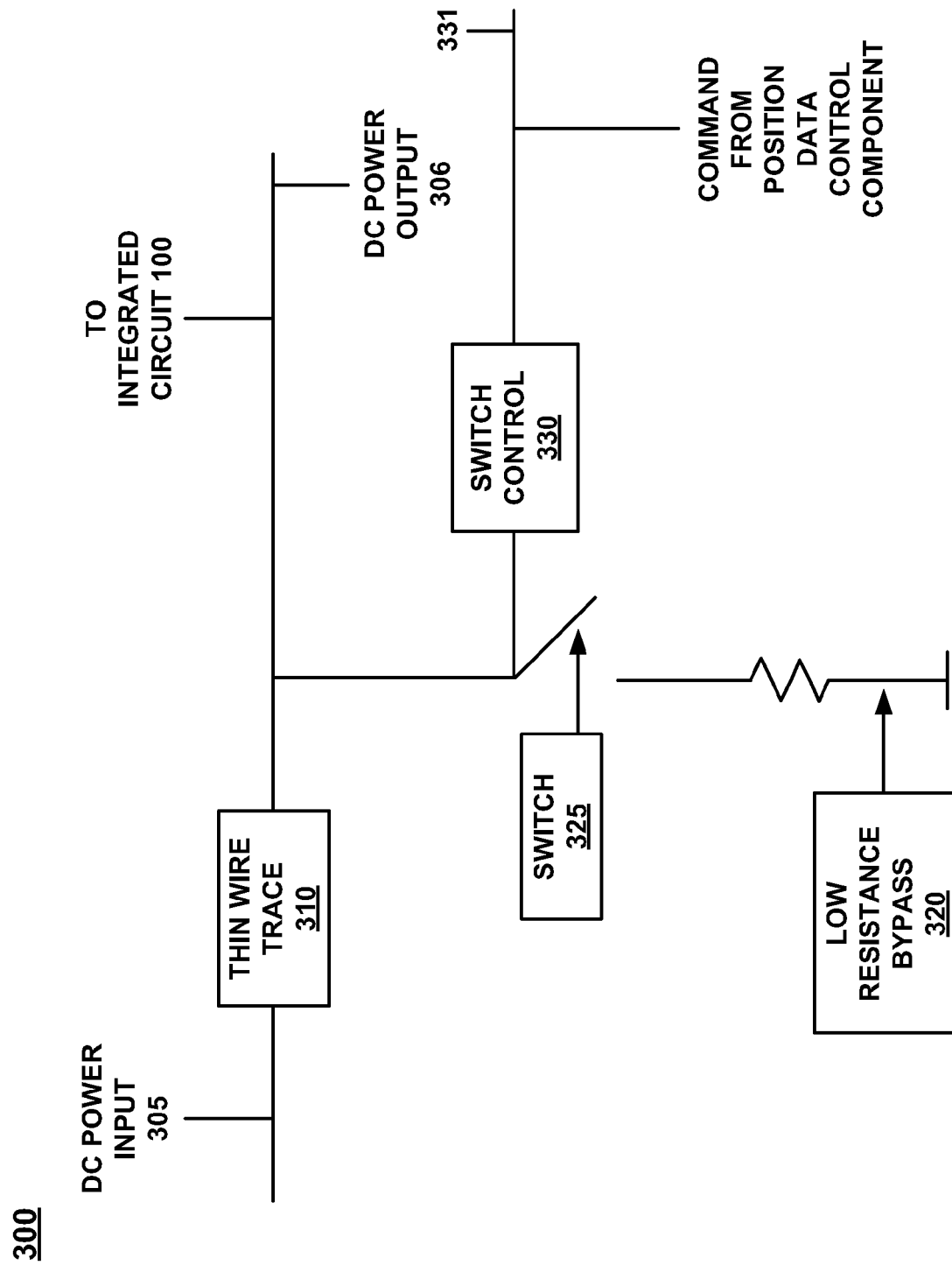
FIG. 3 is a block diagram of an example circuit for disabling a circuit for exclusion zone compliance in accordance with an embodiment of the present invention.

FIG. 3 is a block diagram of an example circuit 300 for disabling a circuit for exclusion zone compliance in accordance with an embodiment of the present invention. In FIG. 3, a direct current (DC) power input 305 is coupled with a thin wire trace 310. DC power input is configured for providing power from power coupling 129 to the rest of circuit 100. Also shown is a switch 325 coupled with DC power output 306 and with a low resistance bypass 320. In one embodiment, switch control 330 controls the operation of switch 325.

During normal operating conditions, power from power coupling 129 passes through thin wire trace 310 to the rest of circuit 100 via DC power output 306. Additionally, switch control 330 controls switch 325 such that it is open and does not permit current to pass to low resistance bypass 320. In one embodiment, when it is determined that circuit 100 is within an exclusion zone, data control component 104 generates a signal which is input to switch control 330. Switch control 330 then closes switch 325 such that power is drawn from DC power output 306 to low resistance bypass 320. In so doing sufficient current is drawn through thin wire trace 310 that it burns out when switch 325 is closed. As a result, power from power coupling 129 to the rest of circuit 100 is permanently interrupted and circuit 100 cannot be subsequently used to receive navigation signals, or to output data used for determining a geographic position. It is noted that thin wire trace 310 can be implemented as a fusible link in one embodiment.

It is noted that a variation of circuit 300 may be inserted between data control component 104 and position data serial port 105 such that in response to a signal from data control component 104 results in the closing of switch 325 in one embodiment. This in turn permanently severs the communicative coupling between data control component 104 and position data serial port 105. As a result, navigation data from circuit 100 is permanently interrupted and circuit 100 cannot be subsequently used to receive navigation signals, or to output data used for determining a geographic position.

Figure 4:
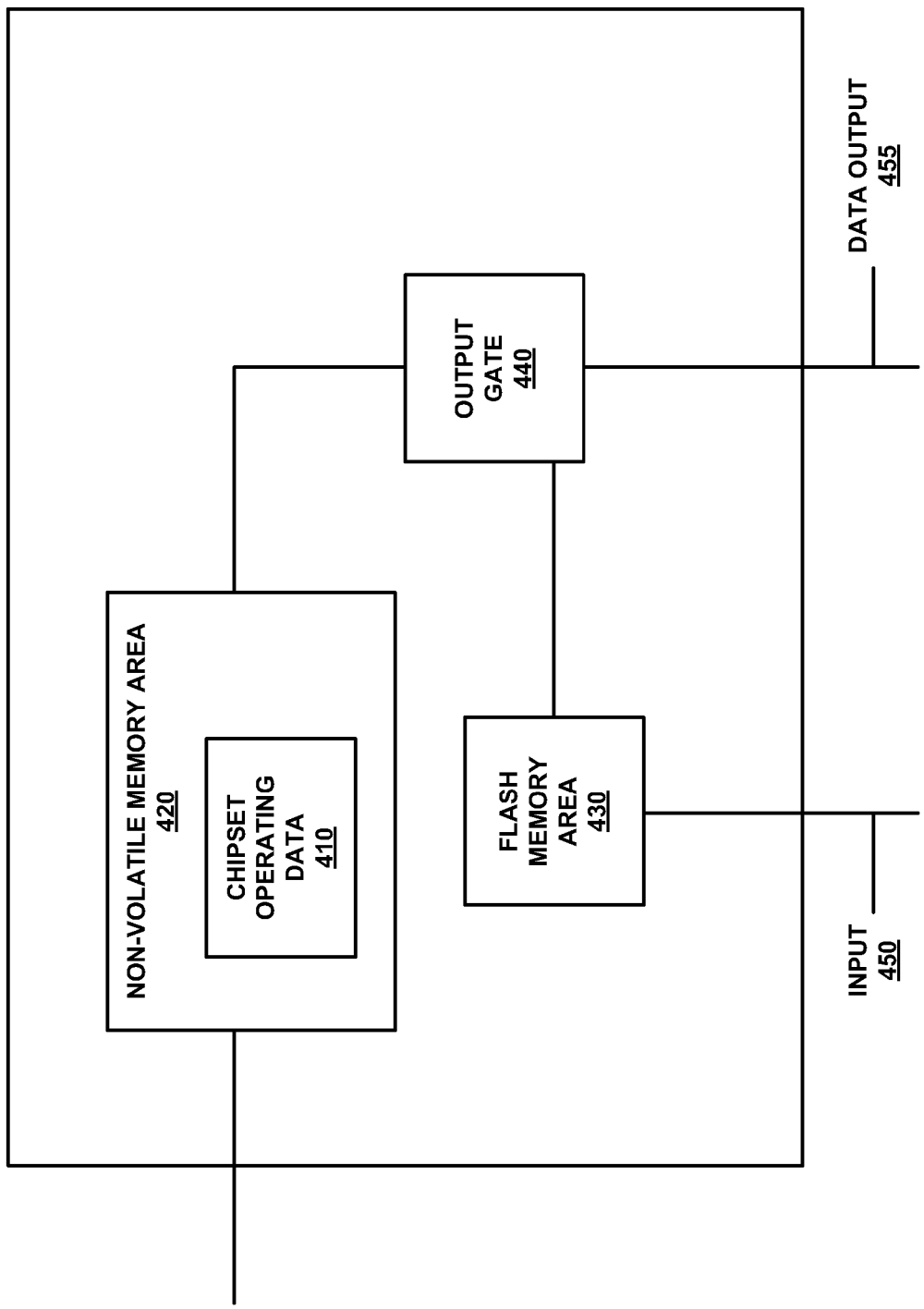
FIG. 4 is a block diagram of an example non-volatile memory in accordance with one embodiment of the present invention.

FIG. 4 is a block diagram of an example non-volatile memory 130 in accordance with one embodiment of the present invention. In one embodiment, chipset operating data 410 is stored in a non-volatile memory area 420. In one embodiment, non-volatile memory area 420 comprises a read-only memory device for permanently storing digital data and instructions comprising an operating system for circuit 100. In another embodiment, non-volatile memory area 420 comprises a programmable memory device such as a Flash memory device, an EEPROM memory device, or the like for persistent storage of digital data and instructions for circuit 100. The use of programmable memory for the persistent storage of data and instructions is widely implemented in the computing arts. One use of these devices is to store BIOS data and instructions used to boot a computer or other electronic device. Programmable memory is increasingly used to store BIOS and similar data because it has the additional advantage of permitting updates or changes to the operating system of the circuit via remote means which was not possible with previously used Write Once, Read Many data storage devices.

In FIG. 4, non-volatile memory 130 further comprises Flash memory area 430. In one embodiment, Flash memory area 430 is not accessible from outside of non-volatile memory 130. In other words, Flash memory area 430 cannot be reprogrammed or updated with new data once it has been written. It is noted that Flash memory area 430 may implement another type of persistent memory in one embodiment of the present invention. In FIG. 4, non-volatile memory 130 further comprises an output gate 440 from which digital data and instructions from non-volatile memory 130 are output to other components of circuit 100.

In one embodiment, Flash memory area 430 stores a command which is written to output gate 440 in response to a signal from data control component 104 via input 450. For example, during normal operation of non-volatile memory 130, the gating function of output gate 440 is written as a logical "0" and digital data and instructions can be output from volatile memory 130 via data output 455. However, if it is determined that circuit 100 is within an exclusion zone, data control component 104 outputs a signal to volatile memory 130 which is input to Flash memory area 430 via input 450. In response to the signal from data control component 104, Flash memory area 430 writes a destruction command stored therein into output gate 440. In one embodiment, the destruction command re-writes the gating function of output gate 440 to a logical "1" which inhibits the data output functioning of output gate 440. Thus, the digital data and instructions comprising the operating system of circuit 100 can no longer be output from non-volatile memory 130. In so doing, circuit 100 is rendered unusable. Furthermore, because its operating system is no longer accessible, there is no way to enable output gate 440 and circuit 100 is thus rendered permanently disabled. It is noted that the destruction command can be written from Flash memory 430 into output gate 440 in response to other conditions or commands as well. For example, the detection of an unauthorized operating state, or of tampering with data or components of circuit 100, may also result in the writing of the destruction command from Flash memory 430 into output gate 440.

Embodiments of the present invention, a circuit for exclusion zone compliance, are thus described. While the present invention has been described in particular embodiments, it should be appreciated that the present invention should not be construed as limited by such embodiments, but rather construed according to the following claims.

What is claimed is:

1. A circuit for exclusion zone compliance, said circuit comprising:
   a satellite navigation signal reception component configured for receiving satellite signals;
   a navigation data deriving component communicatively coupled with said satellite navigation signal reception component, said navigation data deriving component configured for deriving position data and a clock time from said satellite signals;
   a non-volatile memory component communicatively coupled with said navigation data deriving component and configured for storing an encrypted data set describing boundaries of an exclusion zone;
   a data blocking component communicatively coupled with said non-volatile memory device and navigation data deriving component, said data blocking component configured for controlling an accessing of said encrypted data set; and
   a data control component communicatively coupled with said navigation data deriving component, said data control component configured for blocking an output of a signal from said circuit in response to either of an indication selected from a group consisting of:
   an indication that said circuit is located within said exclusion zone and an indication that said output of said signal is not permitted based upon said clock time.

2. The circuit of claim 1 wherein said non-volatile memory component comprises a read-only memory component.

3. The circuit of claim 1 wherein said non-volatile memory component comprises a programmable memory device.

4. The circuit of claim 1 wherein said circuit comprises an integrated circuit.

5. The circuit of claim 1 wherein said data blocking component further comprises:
   a checksum determining component configured for determining a checksum based upon said encrypted data set; and
   a checksum comparison component communicatively coupled with said checksum determining component, said checksum comparison component configured for comparing a second checksum value stored by said non-volatile memory component with said checksum and wherein said data blocking component prevents said navigation data deriving component from accessing said encrypted data set when said checksum comparison component determines that said checksum does not match said second checksum value.

6. The circuit of claim 5 further comprising:
an encrypted data set input communicatively coupled with said non-volatile memory component configured for receiving an updated encrypted data set.

7. The circuit of claim 6 wherein said data blocking component further comprises:
a date comparison component configured for comparing a date associated with said updated encrypted data set with a second date corresponding to a valid encrypted data set and wherein said data blocking component is further configured for preventing said navigation data deriving component from accessing said updated encrypted data set when said date comparison component determines that said date associated with said updated encrypted data set does not match said second date corresponding to a valid encrypted data set.

8. The circuit of claim 7 wherein said date comparison component further comprises:
a clock time input configured for receiving said clock time from said navigation data deriving component; and
a time comparison component configured for comparing said clock time with said date.

9. The circuit of claim 6 further comprising:
a second encrypted data set input communicatively coupled with said data control component and configured for receiving a second encrypted data set; and
an encrypted data set output communicatively coupled with said data control component.

10. The circuit of claim 6 wherein said data blocking component further comprises:
an encryption key comparator configured for comparing a stored encryption key with an encryption key associated with said updated encrypted data set and wherein said data blocking component is further configured for preventing a loading of said updated encrypted data set into said non-volatile memory component when said stored encryption key does not match said encryption key associated with said updated encryption data set.

11. The circuit of claim 1 wherein said data control component is further configured for initiating the permanent disabling of said circuit in response to determining that said circuit is located within an exclusion zone.

12. The circuit of claim 1 further comprising:
a speed determining component configured to determine a speed of said circuit and wherein said data control component is further configured to block said output of said signal from said circuit in response to an indication that a speed threshold of said circuit is exceeded; and
an altitude limiting component configured for comparing an altitude of said circuit received from said navigation data deriving component with an altitude threshold and for outputting an altitude signal when said altitude exceeds an altitude threshold and wherein said data control component is further configured to block an output of said altitude signal from said circuit in response to an indication that said altitude threshold of said circuit is exceeded.

13. A method for implementing exclusion zone compliance, said method comprising:
utilizing a satellite navigation signal reception component disposed within a circuit to receive satellite signals;
utilizing a navigation data deriving component disposed within said circuit to derive position data and a clock time from said satellite signals;
utilizing a non-volatile memory component disposed within said circuit to store an encrypted data set describing boundaries of said exclusion zone;
utilizing a data blocking component communicatively coupled with said non-volatile memory device and said navigation data deriving component to control an accessing of said encrypted data set ; and
utilizing a data control component disposed within said circuit to prevent an output of a signal from said circuit in response to either of an indication that said circuit is located within an exclusion zone and an indication that said output of said signal is not permitted based upon said clock time.

14. The method of claim 13 wherein utilizing said non-volatile memory component further comprises:
utilizing a read-only memory component disposed within said circuit to store said encrypted data set.

15. The method of claim 13 wherein said non-volatile memory component comprises a programmable memory device.

16. The method of claim 13 further comprising:
implementing said satellite navigation signal reception component, said navigation data deriving component, said non-volatile memory component, said data blocking component, and said data blocking component in an integrated circuit.

17. The method of claim 13 wherein utilizing said data blocking component further comprises:
utilizing a checksum determining component for determining a checksum based upon said encrypted data set; and
utilizing a checksum comparison component communicatively coupled with said checksum determining component for comparing a second checksum value stored by said non-volatile memory component with said checksum; and
utilizing said data blocking component to prevent said navigation data deriving component from accessing said encrypted data set when said checksum comparison component determines that said checksum does not match said second checksum value.

18. The method of claim 17 further comprising:
receiving an updated encrypted data set via an encrypted data set input which is communicatively coupled with said non-volatile memory component.

19. The method of claim 18 further comprising:
utilizing a date comparison component for comparing a date associated with said updated encrypted data set with a second date corresponding to a valid encrypted data set; and
using said data blocking component to prevent said navigation data deriving component from accessing said updated encrypted data set when said date comparison component determines that said date associated with said updated encrypted data set does not match said second date corresponding to a valid encrypted data set.

20. The method of claim 19 further comprising:
receiving said clock time from said navigation data deriving component via a clock time input; and
using a time comparison component to compare said clock time with said date.

21. The method of claim 18 further comprising:

receiving a second encrypted data set via a second encrypted data set input communicatively coupled with said data control component; and outputting said second encrypted data set via an encrypted data set output communicatively coupled with said data control component when said circuit is not located within said exclusion zone.

22. The method of claim 18 wherein utilizing said data blocking component further comprises:

utilizing an encryption key comparator for comparing a stored encryption key with an encryption key associated with said updated encrypted data set; and using said data blocking component to prevent a loading of said updated encrypted data set into said non-volatile memory component when said stored encryption key does not match said encryption key associated with said updated encrypted data set.

23. The method of claim 13 further comprising:
utilizing said data control component for initiating a permanent disabling of said circuit in response to determining that said circuit is located within an exclusion zone.

24. The method in of claim 13 further comprising:
receiving an indication that said satellite signals cannot be accessed by satellite navigation signal reception component; and utilizing said data control component disposed within said circuit to prevent said output of said signal from said circuit in response to said indication that said satellite signals cannot be accessed by said satellite navigation signal reception component.

25. The method of claim 13 further comprising:
blocking said output of said signal from said circuit in response to an indication that a speed threshold of said circuit is exceeded; and blocking said output of said signal from said circuit in response to an indication that an altitude threshold of said circuit is exceeded.

* * * * *